United States Patent [19]
Moraes et al.

[11] Patent Number: 6,052,587
[45] Date of Patent: Apr. 18, 2000

[54] SIGNAL ASSESSED USER TERMINAL SYSTEM ACCESS IN SATELLITE COMMUNICATION SYSTEMS

[75] Inventors: Jose Luiz Albuquerque Moraes, Middlesex; Sze-Ching Lu, Surrey, both of United Kingdom

[73] Assignee: ICO Services Ltd., London, United Kingdom

[21] Appl. No.: 08/916,334

[22] Filed: Aug. 22, 1997

[30] Foreign Application Priority Data

Aug. 24, 1996 [GB] United Kingdom .................... 9617775

[51] Int. Cl.⁷ ..................................................... H04Q 7/38
[52] U.S. Cl. ........................................... 455/430; 455/13.1
[58] Field of Search ................................ 455/12.1, 13.1, 455/427, 430, 450, 436, 437, 438, 439; 370/310, 329, 341; 342/357

[56] References Cited

U.S. PATENT DOCUMENTS

| | | | |
|---|---|---|---|
| 5,327,572 | 7/1994 | Freeburg | 455/430 |
| 5,481,592 | 1/1996 | Azer | 455/430 |
| 5,590,395 | 12/1996 | Diekelman | 455/430 |
| 5,619,209 | 4/1997 | Horstein et al. | 455/430 |
| 5,652,750 | 7/1997 | Dent et al. | 455/427 |
| 5,655,005 | 8/1997 | Wiedeman et al. | 455/430 |
| 5,832,379 | 10/1997 | Mallinckrodt | 455/12.1 |
| 5,860,058 | 8/1996 | Daniel et al. | 455/12.1 |

FOREIGN PATENT DOCUMENTS

| | | |
|---|---|---|
| 0 562 374 A1 | 9/1993 | European Pat. Off. . |
| 2 275 588 | 8/1994 | United Kingdom . |
| 2293725 | 4/1996 | United Kingdom . |
| 2 295 296 | 5/1996 | United Kingdom . |
| 9617775 | 11/1996 | United Kingdom . |

*Primary Examiner*—William G. Trost
*Assistant Examiner*—Jean A. Gelin
*Attorney, Agent, or Firm*—McDermott, Will & Emery

[57] ABSTRACT

A satellite communications system comprises satellites 9A–C, earth stations 7A–E, user terminals 11 and controlling gateways 3 in the form of mobile satellite switching centers 5A–E. Access to and from a user terminal 11 may be gained from and to a terrestrial telephone system 1 by earth stations 7A–E contacting the satellites 9A–C and by the satellites contacting the user terminals 11. The satellites 9A–C periodically broadcast messages indicative of the earth station 7A–E with which they are instantly in contact. The user terminal 11 listens to these broadcasts, assesses the quality of the received signal, and keeps a league table based on an accumulated score allocated to each earth station 7A–E which can be heard. When calling into the system, the user terminal pages earth stations in descending order of score in the league table. When in contact, the user terminal 11 sends the league table to the system. When subsequently trying to contact the user terminal 11, the system uses earth stations in descending order of score in the league table, last received from the user terminal.

27 Claims, 6 Drawing Sheets

SIGNAL ASSESSED USER TERMINAL SYSTEM ACCESS IN SATELLITE COMMUNICATION SYSTEMS

FIELD OF THE INVENTION

This invention relates to a telecommunication system where remote user terminals are in receipt of access to a larger telecommunication system by means of direct access to a satellite which, in turn, is in communication with a ground station. It particularly relates to a system where, potentially, a user terminal can access more than one satellite and where, via a satellite or satellites, can access more than one ground station.

BACKGROUND

First, it is necessary to describe the general terrestrial telephone system. This is the "larger telecommunication system" mentioned above.

The terrestrial telephone system comprises the sum of all of the wire, optical, point-to-point microwave and any other means of conducting signals from one point to another via the surface of the earth, together with their associated switches, amplifiers, encoders, decoders, amplifiers and repeaters. On a national level, the network links all access points in a country. Country is linked to country via international trunk lines. Oceans are spanned by submarine cables. The terrestrial network is a transparent carrier where a signal may be introduced from an access point and routed to another, selected access point elsewhere on the surface of the earth. A subscriber can access the terrestrial system via various gateways. For example, the terrestrial system can be accessed from the public switched telephone network, a public switched data network, an integrated switched digital network, a cellular telephone system, or a satellite telephone system. Each gateway provides a plurality of different access points, which, depending upon the gateway, can range from a simple telephone to a complex data or image source. The subscriber's gateway, at the subscribers request, commands the terrestrial system to route and carry the message from the subscriber to a selected destination. The message comes in through the subscriber's gateway, passes through the terrestrial system, and exits through the selected destination gateway to reach the access point required. Once the message path is established, two-way communication can commence. This is the way the terrestrial system works. Each gateway is connected to another single gateway. The terrestrial system is not adapted, readily, to switch, during the course of a message, between different source gateways or between different destination gateways.

Each gateway, in what is generally understood to be a telephone system, provides a plurality of access points whereby a subscriber may make or receive calls. Each access point is unique in its identify or location and definitely is unique to its particular ateway. In other words, one access point means one ateway.

Now, satellite systems provide a gateway to the terrestrial system via earth stations, capable of establishing two way contact with a satellite or satellites. In turn, the satellites can communicate with user terminals (portable handsets). The user terminals are thus put in contact with the earth stations which can act as a gateway to the terrestrial system.

Sadly, each earth station is a separate gateway. Generally, the earth stations are widely spread apart. The present invention imagines an overall system which has just one, two, or at best, very few, earth stations on each continent. Thus, in general, each user terminal will see satellites which are visible only to one earth station. This satisfies the terrestrial network requirement "one access point means just one gateway", This situation is not a problem. However, there a circumstances, for example, in the middle of the pacific ocean, in the middle of the Sahara Desert, or high atop the Andes, where a user terminal may be able to see a satellite or satellites which, in turn, are visible to more than one earth station. This now breaks the rule "one access point means just one gateway". The user terminal is an access point. Each earth station is a gateway. Now there is the situation "one access point-many gateways". The terrestrial network is not adapted to respond to multiple gateways. Further, the signals to and from the earth station, satellites and user terminals are forever changing. What was a perfectly good satellite link a moment ago is no longer functional because the satellite has moved, the user terminal has been shielded by a building or other structure, and a host of other reasons. However, one of the other potential user terminal to satellite to ground station links might still work. How can the switch between ground stations be effected without confusing the operation of the terrestrial network? How does the system know which ground station is best to use to establish contact with the user terminal? How does the user terminal know which ground station to page when it needs to make contact? Much time and fruitless effort could be wasted in attempting to reach user terminals or earth stations with little hope of establishing contact. The present invention seeks to provide a solution involving minimal cost and a high degree of probability of establishing contact.

SUMMARY OF THE INVENTION

According to a first aspect, the present invention consists in a satellite communication system wherein a user terminal is operative to communicate with one or more out of a plurality of satellites; wherein each of said plurality of satellites is operative to communicate with one or more out of a plurality of earth stations to provide communication between said user terminal and at least one of said earth stations; where each of said earth stations is operative, periodically, to provide a broadcast message, via said satellites, which can be received by said user terminal, said broadcast message identifying that earth station from which it originated; and wherein said user terminal is operative to monitor said broadcasts: said system being characterised by said user terminal being operative to perform an assessment of the quality of the signal in each broadcast message received; by said user terminal being operative to establish and maintain a league table based on the assessed quality of the signal in said broadcast messages received from each of said plurality of earth stations whose broadcast messages are audible to said user terminal; and by said user terminal being operative, when making a request for service from said system, to direct said request to that one out of said plurality of earth stations which is top of said league table.

The first aspect of the invention further provides that said assessment of the quality of the signal, in said broadcast messages received by said user terminal, includes an assessment of the strength of the signal.

The first aspect of the invention further provides that said assessment of the quality of the signal, in said broadcast messages, received by said user terminal, includes an assessment of the signal to noise ratio of the signal.

The first aspect of the invention yet further provides that said assessment of said signal to noise ratio includes measurement of the strength of unwanted or extraneous signals immediately before or after each of said broadcast messages, and comparison thereof against said assessment of said strength of said signal in said broadcast message.

The first aspect of the present invention still further provides that said assessment of the quality of the signal, in said broadcast messages, received by said user terminal, includes an assessment of the bit error rate.

The first aspect of the present invention still further provides that said assessment of the quality of the signal, in said broadcast messages, received by said user terminal from a particular earth station out of said plurality of earth stations, includes an assessment of the amount of elapsed time since a broadcast message was received from that particular earth station.

The first aspect of the present invention yet further provides that said user terminal, in the event of said request for service, directed to said earth station, which has the highest assessment in said league table, being unsuccessful, is operative to select each other earth station, in said league table, in turn, in descending order of assessment, to direct said request for service thereto, until an earth station is found which responds to said request for service.

According to a second aspect, the present invention consists in a method for use in a satellite communication system wherein a user terminal is operative to communicate with one or more out of a plurality of satellites; wherein each of said plurality of satellites is operative to communicate with one or more out of a plurality of earth stations to provide communication between said user terminal and at least one of said earth stations; where each of said earth stations is operative, periodically, to provide a broadcast message, via said satellites, which can be received by said user terminal, said broadcast message identifying that earth station from which it originated; and wherein said user terminal is operative to monitor said broadcasts; said method being characterised by including the steps of: said user terminal performing an assessment of the quality of the signal in each broadcast message received; said user terminal establishing and maintaining a league table based on the assessed quality of the signal in said broadcast messages received from each of said plurality of earth stations whose broadcast messages are audible to said user terminal; and said user terminal, when making a request for service from said system, directing said request to that one out of said plurality of earth stations which is top of said league table.

The second aspect of the invention also provides a method wherein said assessment of the quality of the signal, in said broadcast messages received by said user terminal, includes an assessment of the strength of the signal.

The second aspect of the invention further provides a method wherein said assessment of the quality of the signal, in said broadcast messages, received by said user terminal, includes an assessment of the signal to noise ratio of the signal.

The second aspect of the invention further provides a method wherein said assessment of said signal to noise ratio includes measurement of the strength of unwanted or extraneous signals immediately before or after each of said broadcast messages, and comparison thereof against said assessment of said strength of said signal in said broadcast message.

The second aspect of the invention yet further provides a method wherein said assessment of the quality of the signal, in said broadcast messages, received by said user terminal, includes an assessment of the bit error rate.

The second aspect of the invention further provides a method wherein said assessment of the quality of the signal, in said broadcast messages, received by said user terminal from a particular earth station out of said plurality of earth stations, includes an assessment of the amount of elapsed time since a broadcast message was received from that particular earth station.

The second aspect of the invention further provides a method including the steps of said user terminal, in the event of said request for service, directed to said earth station, which has the highest assessment in said league table, being unsuccessful, selecting each other earth station, in said league table, in turn, in descending order of assessment, and directing said request for service thereto, until an earth station is found which responds to said request for service.

According to a third aspect, the present invention consists in a user terminal for use in a satellite communication system wherein said user terminal is operative to communicate with one or more out of a plurality of satellites; wherein each of said plurality of satellites is operative to communicate with one or more out of a plurality of earth stations to provide communication between said user terminal and at least one of said earth stations; where each of said earth stations is operative, periodically, to provide a broadcast message, via said satellites, which can be received by said user terminal, said broadcast message identifying that earth station from which it originated; and wherein said user terminal is operative to monitor said broadcasts; said user terminal being characterised by being operative to perform an assessment of the quality of the signal in each broadcast message received; by said user terminal being operative to establish and maintaining a league table based on the assessed quality of the signal in said broadcast messages received from each of said plurality of earth stations whose broadcast messages are audible to said user terminal; and by said user terminal, when making a request for service from said system, being operative to direct said request to that one out of said plurality of earth stations which is top of said league table.

The third aspect of the invention further provides a user terminal wherein said assessment of the quality of the signal, in said broadcast messages received by said user terminal, includes an assessment of the strength of the signal.

The third aspect of the invention further provides a user terminal wherein said assessment of the quality of the signal, in said broadcast messages, received by said user terminal, includes an assessment of the signal to noise ratio of the signal.

The third aspect of the invention yet further provides a user terminal, wherein said assessment of said signal to noise ratio includes measurement of the strength of unwanted or extraneous signals immediately before or after each of said broadcast messages, and comparison thereof against said assessment of said strength of said signal in said broadcast message.

The third aspect of the invention further provides a user terminal wherein said assessment of the quality of the signal, in said broadcast messages, received by said user terminal, includes an assessment of the bit error rate.

The third aspect of the invention further provides a user terminal wherein said assessment of the quality of the signal, in said broadcast messages, received by said user terminal from a particular earth station out of said plurality of earth stations, includes an assessment of the amount of elapsed time since a broadcast message was received from that particular earth station.

The third aspect of the invention still further provides a user terminal operative, in the event of said request for service, directed to said earth station, which has the highest assessment in said league table, being unsuccessful, to select each other earth station, in said league table, in turn, in descending order of assessment, and to direct said request for service thereto, until an earth station is found which responds to said request for service.

According to a fourth aspect, the present invention consists in a supervisory earth station, for use in a satellite communication system wherein a user terminal is operative to communicate with one or more out of a plurality of satellites; wherein each of said plurality of satellites is operative to communicate with said supervisory earth station and with one or more out of a plurality of other earth stations to provide communication between said user terminal and at least one of said supervisory earth station or said other earth stations; where each of said earth stations is operative, periodically, to provide a broadcast message, via said satellites, which can be received by said user terminal, said broadcast message identifying that earth station from which it originated; wherein said user terminal is operative to monitor said broadcasts; wherein said user terminal is operative to perform an assessment of the quality of the signal in each broadcast message received; wherein said user terminal is operative to establish and maintaining a league table based on the assessed quality of the signal in said broadcast messages received from each of said plurality of earth stations whose broadcast messages are audible to said user terminal; and wherein said user terminal, when making a request for service from said system, is operative to direct said request to said supervisory earth station, if said supervisory earth station is top of said league table, or to that one out of said plurality of other earth stations which is top of said league table; said supervisory earth station being operative to receive said league table from said user terminal and, when subsequently paging said user terminal, being operative to select, in turn, in descending order of assessment, itself or each of said plurality of other earth stations, to page said user terminal until an earth station is found to whose paging said user terminal responds.

The fourth aspect of the invention also provides a supervisory earth station for use in a system wherein said assessment of the quality of the signal, in said broadcast messages received by said user terminal, includes an assessment of the strength of the signal.

The fourth aspect of the invention further provides a supervisory earth station for use in a system wherein said assessment of the quality of the signal, in said broadcast messages, received by said user terminal, includes an assessment of the signal to noise ratio of the signal.

The fourth aspect of the invention further provides a supervisory earth station for use in a system wherein said assessment of said signal to noise ratio includes measurement of the strength of unwanted or extraneous signals immediately before or after each of said broadcast messages, and comparison thereof against said assessment of said strength of said signal in said broadcast message.

The fourth aspect of the invention yet further provides a supervisory earth station for use in a system wherein said assessment of the quality of the signal, in said broadcast messages, received by said user terminal, includes an assessment of the bit error rate.

The fourth aspect of the invention still further provides a supervisory earth station for use in a system wherein said assessment of the quality of the signal, in said broadcast messages, received by said user terminal from said supervisory earth or any particular other earth station out of said plurality of other earth stations, includes an assessment of the amount of elapsed time since a broadcast message was received from said supervisory earth station or said particular other earth station out of said plurality of other earth stations.

In a preferred embodiment, the satellite earth stations are gateways to the terrestrial system. The user terminal preferably has a program, stored on its subscriber identity module, a card including a microprocessor and memory, to execute the activities required. For preference, the user terminal employs the microprocessor on the subscriber identity module to execute the behavioural program/s herinafter described, and uses a signal processor, integral with itself and not on the subscriber identity module, to carry out the signal quality measurements required. The individual earth stations, for preference, have means for storing the league table, origination from the user terminal, and contain appropriate routines, within their controlling systems, to respond to the league table in the manner hereinbefore and hereinafter described. One of the earth stations preferably contains a controller which turns it into a supervisory earth station able to supervise the other earth stations and to control the flow of voice signals and information in the system.

BRIEF DESCRIPTION OF THE DRAWINGS

The present invention is further explained, by way of an example, by the following description, read in conjunction with the appended drawings, in which.

DESCRIPTION OF EMBODIMENTS

Figure 1:
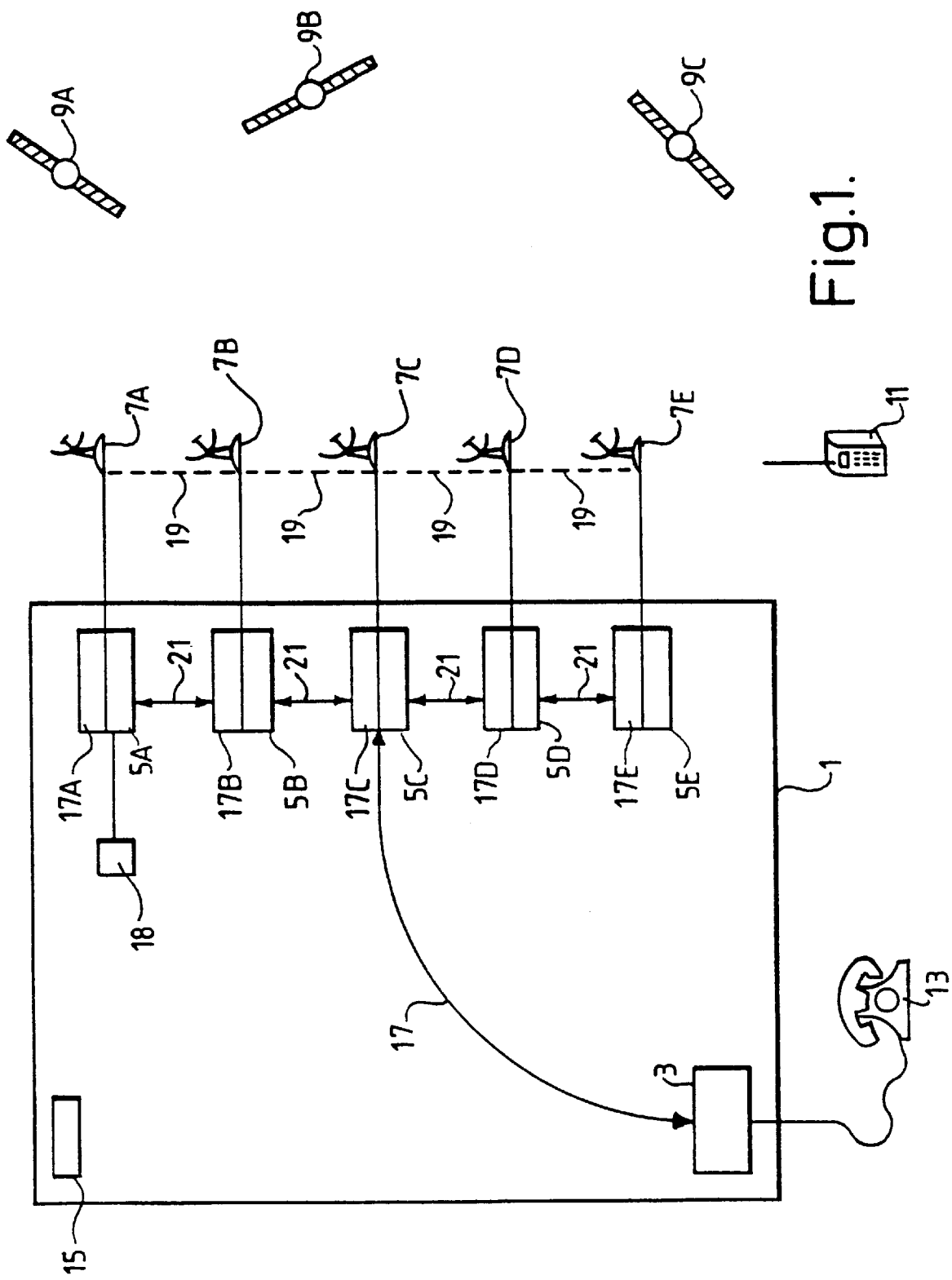
FIG. 1 is a highly schematised representation of the global communications system within which the present invention is comprised and shows a mobile satellite switching centre, acting as a gateway to the terrestrial system, and also acting as a controller to an earth station.

Attention is first drawn to FIG. 1. The terrestrial system 1 comprises a plurality of gateways 3 which may be individual national public or cellular telephone systems, public data switched data networks, public land mobile systems, other satellite systems, and so on. Included in the gateways are a number of mobile satellite switching centres 5A 5B 5C 5D 5E. Each mobile satellite switching centre 5A–E is uniquely connected to one, and only one, earth station 7A 7B 7C 7D. The earth stations 7A–E are scattered about the world. They are designed to interact with a constellation of satellites 9A 9B 9C, in two orthogonal orbits, with ten operational satellites in each orbit with two spares, each orbit at 45 degrees to the equator and at a height of 10,500 Km from the surface of the earth. This is only an example of one satellite system with which the present invention would work. As will become apparent to those skilled in the art upon reading the following description and claims, the invention is applicable to virtually any satellite system where a multiple gateway problem arises so far as interaction with a user terminal (portable handset or other device intended to communicate directly with a satellite) is concerned.

Each of the earth stations 7A–E can communicate with any of the satellites 9A–C which may be within its line of sight. At any one time, different satellites 9A–C may be in the line of sight of different earth stations 7A–E. Some satellites 9A–E may be visible to more than one earth station 7A–E.

A user terminal 11, otherwise unconnected to the terrestrial system 1, perhaps because it is in a remote location or, perhaps, simply because it does not have the ability so to connect, is able to exchange radio signals with any of the satellites 9A–C which may be in its line of sight and sufficiently elevated above the horizon for communication to be established and maintained. The user terminal 11 is generally in the form of a portable radio telephone handset, not unlike a cellular radio telephone handset, but adapted to function with satellites 9A–C. Now, a satellite 9A–C, visible to the user terminal 11, may, in turn, be visible to more than one earth station 7A–E. Likewise, more than one satellite 9A–C may simultaneously be visible to the user terminal 11 so that a user terminal 11, potentially, may be in simultaneous contact with multiple earth stations 5A–E.

When a subscriber 13 wishes to call the user terminal 11 the terrestrial system 1, recognising the unique identifier of the user terminal 11, is referred to a home location register 15, located within the terrestrial system 1. The home location register 15 is the normal register whereat the details of the user terminals 11 are stored, and may, physically, be located proximate to the point where the user terminal 11 is generally located. For the purpose of this example, it is assumed that the user terminal 11 has moved, and is no longer in its usual location.

At some point, the user terminal 11 has logged on to a satellite and has thus engaged one of the mobile satellite switching centres 5A 5B 5C 5D. This is its visitor location. Each mobile satellite switching centre 5A–E comprises a corresponding visitor location register 17A–E. When the user terminal 11 logs onto the terrestrial system 1 via the earth station 7A–E to which it selected access and, in turn, onto its corresponding gateway, which, in this instance, is the related mobile satellite switching centre 5A–E, a message is sent through the terrestrial system 1 so that the identity of the particular gateway 5A–E wherethrough the user terminal 11 might be found, is received and stored in the home location register 15. When the subscriber 13 attempts to call the user terminal 11, reference is first made to the home location register 15. The home location register 15 now holds the identity of the gateway 5A–E wherethrough the user terminal 11 is to be found. The audio signal, from the subscriber and via the subscriber's gateway 3, is routed directly to the visitor location (let us say 5C) whereat the user terminal 11 is registered.

As a result of the operation of the terrestrial system 1, the subscriber 13 is directly connected, via the subscriber's gateway 3, for two way voice communication, as indicated by the arrow 17, to the relevant mobile satellite switching centre 5C, whereon the user terminal 11 happens to be registered as a "visitor location"

Now, so far, everything, as described, is perfectly normal, so far as the terrestrial system 1 is concerned. A subscriber 13 has gone through his related gateway 3 to access another gateway 5C for establishment of two way communications. From now on, things become a little more complicated because the user terminal 11 happens to be connected via an earth station 5C whereat the connection via the relevant satellite 9A–C is a transient possibility and whereat the possibility of any form of satellite connection between the user terminal 11 and the earth station 5C whereat the visitor location information 17C happens to be stored is, at best, uncertain, At any moment, the earth station 5A–C could change from the visitor location earth station 5C to one of the others 5A 5B 5D 5E. This is because satellites are constantly changing their position with respect to the user terminal 11 and with respect to the earth stations 5A–E. Conditions can change, making the location of the best positioned earth station 7A–E a matter of some uncertainty.

Each of the earth stations 7A–E is linked to every other earth station 7A–E by a low capacity digital link 19 capable of passing instructions and responses between the earth stations 7A–E but of insufficient capacity to carry voice signals.

Each mobile satellite switching centre 5A–E is linked, via the terrestrial network 1, to every other mobile satellite switching centre 5A–E by a voice link 21 capable of two way voice grade communication.

The digital link 19 is a simple packet network and it is envisaged that this can be a permanent connection. Alternatively, it can consist in leased or borrowed time slots in systems comprising part of the terrestrial system.

The voice link 21 is an expensive item to create and to run. It is to be recalled that the earth stations 7A–E may be many thousands of kilometers apart and more than likely separated by oceans. Thus, the associated mobile satellite switching centres 5A–5E are similarly separated. While it is within the scope of the present invention that the voice link 21 can be a permanent, dedicated voice grade channel or channels, it is preferred that the voice link 21 is a line, already existing within the terrestrial network and which can be called upon when required. For example, when one mobile satellite switching centre 5C wishes to call another 5E, being itself a gateway, the one mobile satellite switching centre 5C simply places a call through the terrestrial system 1 to the other 5E and establishes the voice link 21 that way. This example is not intended to be restrictive, and those, skilled in the art, will be aware of numerous other ways in which the voice link 21 can be created.

Figure 2:
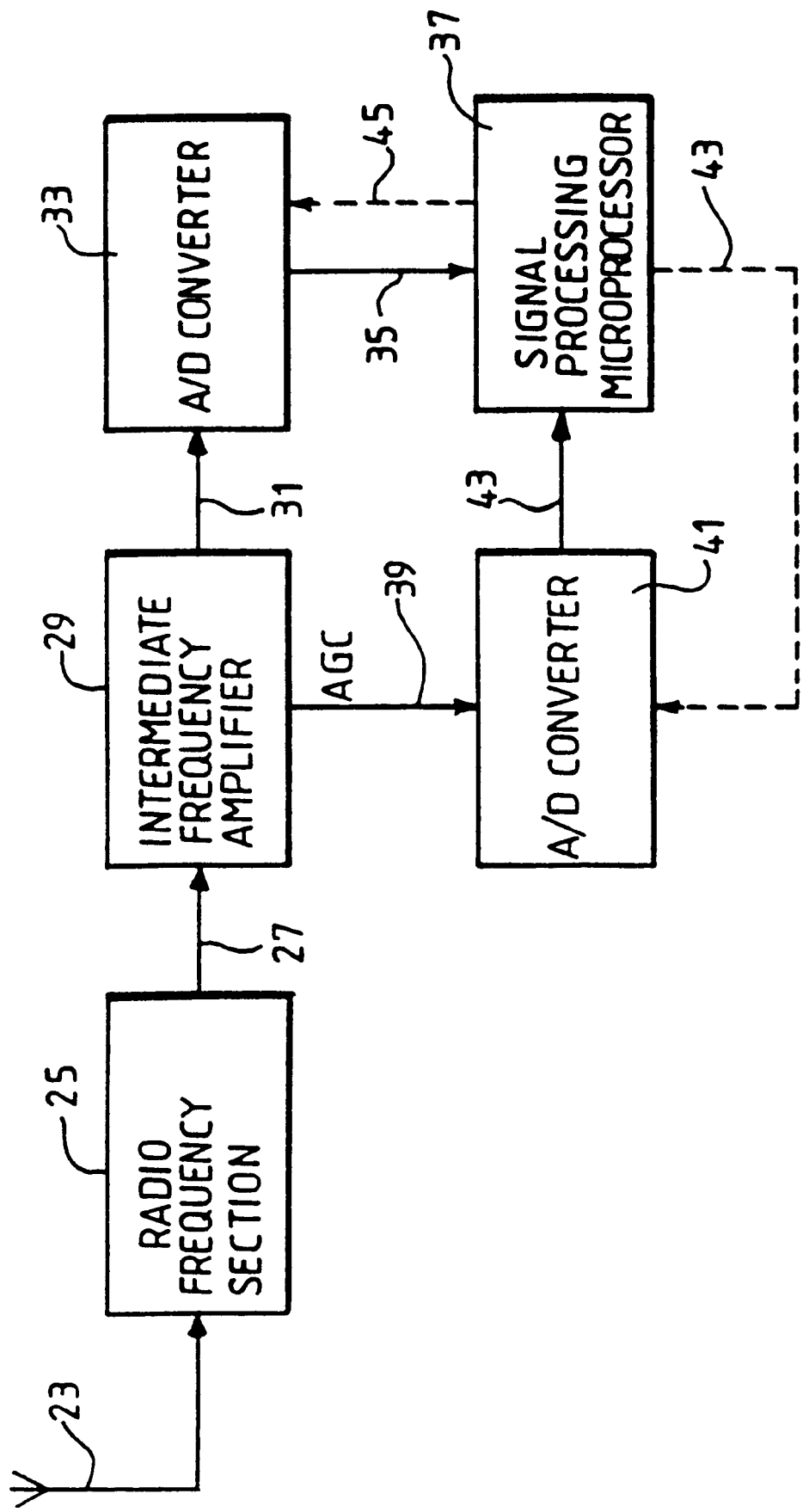
FIG. 2 is a schematic diagram of the radio receiving portion of the user terminal, shown in FIG. 1.

FIG. 2 is a schematic block diagram of the radio receiving section of the user terminal 11.

With a few slight differences, the radio receiving section of the user terminal 11 is a conventional supersonic heterodyne (superhet) receiver. An antenna 23 couples a radio frequency input to a radio frequency section 25 which provides radio frequency amplification and changes the frequency of the desired radio signal to an intermediate frequency. The output 27 of the radio frequency section 25 is coupled as input to an intermediate frequency amplifier 29. The intermediate frequency amplifier 29 amplifies the desired radio signal, changed to the intermediate frequency by the radio frequency section 25, and also provides any bandpass filtering which may be required for the desired signal.

The output 31 of the intermediate frequency amplifier 29 is coupled as an analogue input to a signal analogue-to-digital converter 33 and converted into stream of time-separated binary numbers, each representative of the instant value, at the time of sampling, of the analogue signal provided on the output 31 of the intermediate frequency amplifier 29.

The output of the signal analogue-to-digital converter 33, being the stream of binary numbers, herinbefore described, is coupled as the input to a signal processor 37 which, in addition to demodulation and signal recovery, also acts upon the output 35 of the signal analogue-to-digital converter 33 to perform the quality assessment, hereinafter and hereinbefore described, upon the output 31 of the intermediate frequency amplifier 29.

The signal processor 37 is provided in the form of a microprocessor whose general task is to provide all of the protocol and control functions of the user terminal 11. It is to be understood that the additional activities of the signal processor 37, hereinafter described, are carried out in addition to its normal provision of control and protocol functions.

The intermediate frequency amplifier 29 may or may not include an automatic gain control function whereby the output 31 is maintained at or near a predetermined amplitude, despite wide fluctuation of the amplitude of the signal at its input 27, by using the detected output signal level as a gain-reducing feedback signal to earlier amplifier stages in the intermediate frequency amplifier 29. In this instance, it would be difficult for the signal processor 37 to perform an analysis of signal amplitudes since the signal amplitude is normalised by the automatic gain control function of the intermediate frequency amplifier 29. Instead, the automatic gain control feedback voltage 39 is coupled as an analogue input to an AGC analogue-to-digital converter 41 whose output 43, a binary number representative of the instant value of the automatic gain control feedback voltage, is coupled as an input to the signal processor 37 which uses it as representative of instant amplitude of the input signal 31 of the intermediate frequency amplifier 29. The analogue-to-digital converters 33 41 can sample and convert at their own speeds, or may be strobed by the signal processor 33 using first 43 and second 45 strobe lines.

The intermediate frequency amplifier 29 may not include an automatic gain control function, or may include a poorly-regulating automatic gain control function, in either of which instances there is an appreciable variation of the actual amplitude of the output 31 signal amplitude from the intermediate frequency amplifier 29 with extreme variation of the amplitude of the signal on its input 27. In these two either instances, the stream of binary numbers on the output 35 of the signal analogue-to-digital converter 33 are reflective, in their magnitude, either directly, or by a discernible relationship, of the actual signal amplitude at the input 27 of the intermediate frequency amplifier 29. Under these circumstances, the AGC analogue-to-digital converter 41 is superfluous and can be omitted, since the signal processor 37 is capable of assessing the amplitude of any signals received from the intermediate frequency amplifier 29 by inspection of the stream of binary numbers on the output of the signal analogue-to-digital converter 33.

Figure 3:
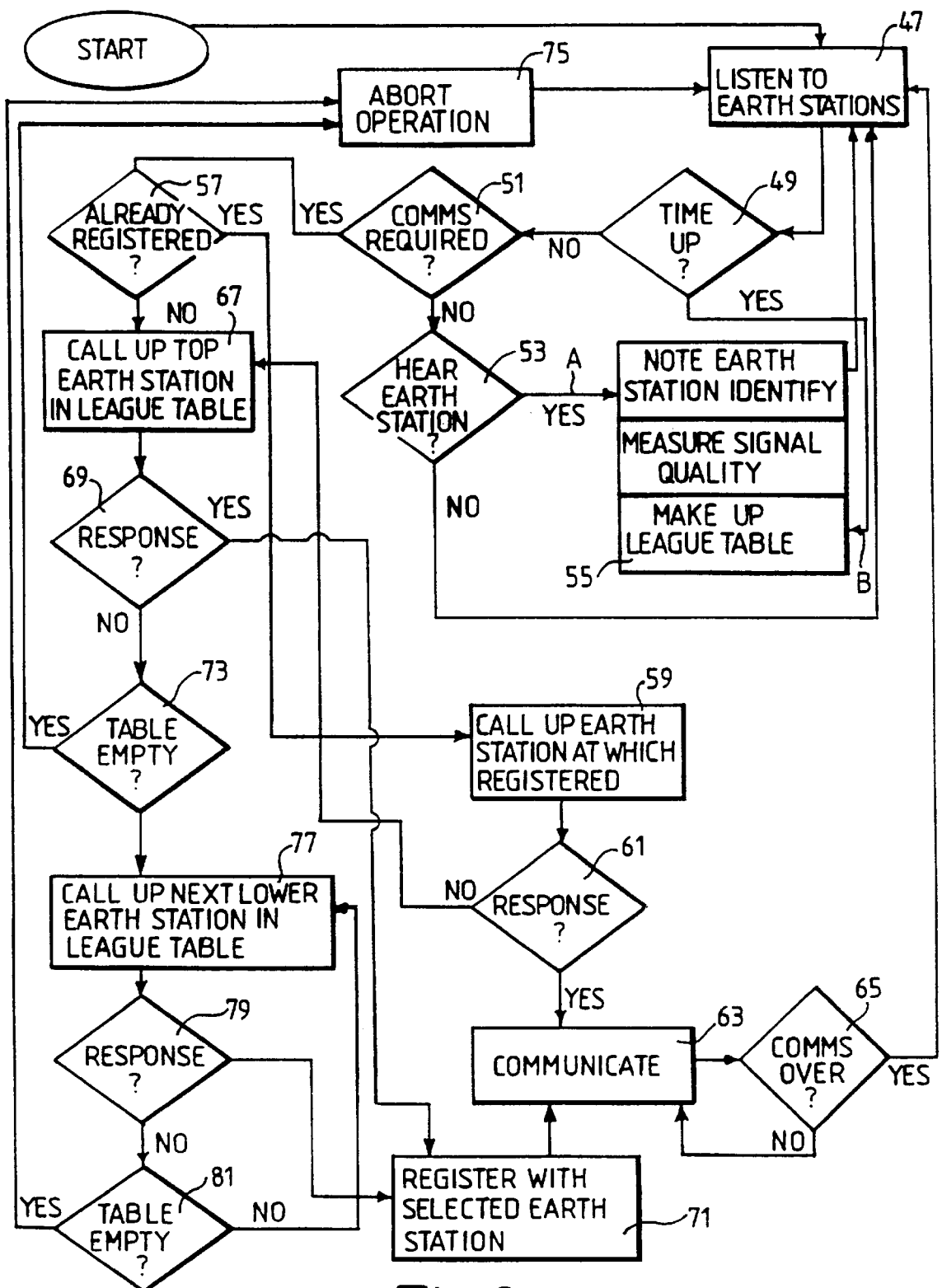
FIG. 3 is a flow chart of the activities of the user terminal when interacting with the system of FIG. 1.

FIG. 3 is a flowchart of the activities of the user terminal 11 when monitoring the broadcasts from the earth stations 7A–E and its activity when contacting an earth station 7A–E.

Even when not functional in the ordinary sense, the user terminal 11 is active and monitoring incoming messages. Each of the satellites 9A–C puts out constant general messages for the information and instruction of whatever user terminals 11 can hear them. In a first activity 47, the user terminal 11 hears the messages, broadcast from the satellites 9A–C. These messages contain information concerning with which earth station 7A–E the particular satellite is in contact.

A first test 49 detects that a predetermined time has elapsed since last the first test 49 was applied. If the predetermined time has not elapsed, control is passed to a second test 51 which determines if some communication operation is required of the user terminal 11. If no communication operation is required, control is passed to a third test 53 which checks to see if a message has been received from one of the earth stations 5A–E. If no message has been received, control is passed back to the first activity 47 where the user terminal 11 resumes listening for messages from the earth stations 7A–E. If the third test 53 detects a message from one of the earth stations 7A–E, control is passed to a second activity 55 where the user terminal 11 notes the identity of the earth station 7A–E from which the message was received, assesses the quality of the received signal, and then makes up a new entry for that earth station 7A–E in a league table where each earth station 7A–E, heard by the user terminal 11, is allocated a score indicative of the likelihood of being able to call up that earth station at a later time. Control is then passed back to the first operation 47 which continues to listen for messages from the earth stations 7A–E.

If the second test 51 detects that some kind of communication is required, the second test 51 passes control to a fourth test 57 which checks to see if the user terminal 11 is already registered at one of the earth stations 7A–E as a visitor 17A–E.

If the fourth test 57 detects that the user terminal 11 is registered at any one of the earth stations 7A–E, control is passed to a third activity 59 which sends a request for service to the named earth station 7A–E at which the user terminal 11 is registered. Control is then passed to a fifth test 61 which waits to see if a response to the request for service is received within a predetermined time. Not shown in the flow chart for reasons of simplicity, but implicit therein, is the notion that the third activity 59 and the fifth test 61 can co-operate to page the named earth station with a request for service up to a predetermined number of times before it is decided that no response has been received.

If the fifth test 61 receives a response for the request for service within its predetermined time, control is passed to a fourth activity 63 wherein the user terminal 11 and the earth station 7A–E which responded to the request for service conduct their communications activity. Initially, the user terminal 11 communicates the contents of the league table to the earth station 7A–E which retains the league table contents for future use, in a manner hereinafter described. The communication activity can range from voice communications, as in a normal telephone call, to routine automatic exchanges of identities and instructions whereby the user terminal remains logged onto the total communication system and gives and receives updates with the total communication system, without any intervention by the operator of the user terminal 11. The communications activity 63 continues until a sixth test 65 detects that the communication is over and passes control back to the first activity 47 where the user terminal once again reverts to monitoring all of the earth stations 7A–E it can hear.

If the fourth test 57 fails to detect that the user terminal is already registered at a particular earth station 7A–E, it passes control to a fifth activity 67 which recalls the league table, stored from a previous interaction with the user terminal 11, from memory, identifies that earth station 7A–E which has the highest score in the league table, and pages that earth station 7A–E with a request for service. Control is then passed to a seventh test 69 which behaves just like the fifth test 61, waiting for a predetermined time for a response to the request for service with an implicit capacity for re-executing the request for service up to a predetermined number of times.

If the seventh test 69 receives a response to the request for service, it passes control to a sixth activity 71 which causes the user terminal 11 to register at that earth station 7A–E which has responded to the request for service. This is the only logical course of action, since all other earth stations 7A–E, so far paged with a request for service, have failed to respond and are, therefore, presumably no longer available.

Once registration is complete, the sixth activity 71 passes control to the fourth activity 63 to execute the communications activity, in the manner described above, including communicating the contents of the league table to the earth station 7A–E, and returns control to earth station monitoring in the first activity 47 when the sixth test 65 signals the end of the communications activity 63.

If the seventh test 69 fails to receive a response to the request for service within its predetermined time and number of retries, control is passed to an eighth test 73 which examines the league table to see if any earth stations 7A–E remain listed therein which have not, so far, been paged with a request for service. If the eighth test 73 detects that the league table is empty (i.e. all stations have been paged), it passes control to a seventh activity 75 which aborts the operation of the user terminal 11 by shutting down the current operation and returns control to the first activity 47 where the user terminal monitors all of the earth stations 7A–E it can hear.

If the eighth test 73 detects that there are still untried earth stations 7A–E in the league table, it passes control to an eighth activity 77 which calls up that earth station 7A–E, remaining in the league table, which has the highest score, and sends a request for service thereto. Control is then passed to a ninth test 79 which looks for a response to the request for service within a predetermined time and number of retries. If the ninth test 79 detects a response to the request for service, it passes control to the sixth activity 71 which registers the user terminal 11 at the earth station 7A–E which responded to the request and carries on through the fourth activity 63 and the sixth test 65 to execute any communications activity and revert to the first activity 47 where the user terminal 11 monitors all of the earth stations 7A–E it can hear.

If the ninth test 79 fails to detect a response to the request for service, it passes control to a tenth test 81 which, like the eighth test 73, checks to see if there are any untried earth stations 7A–E remaining in the league table.

If the tenth test 81 detects no remaining untried earth stations 7A–E in the league table, it passes control to the seventh activity 75 which, as described above, aborts the current operation of the user terminal 11 and reverts to the first activity 47 where the user terminal 11 monitors all of the earth stations 7A–E it can hear.

If the tenth test 81 detects that there are still remaining untried earth stations 7A–E in the league table, it passes control back to the eighth activity 77 which, as described above, calls up the earth station, remaining untried in the league table, with the highest score, and sends a request for service thereto.

If the first test 49 detects that a time-out of predetermined period has elapsed since last the time-out elapsed, it passes control to the second activity 55 where the user terminal 11 revisits the league table to adjust the scores of each of the earth stations entered thereon, as will later be described in detail, dependently upon how much time has elapsed since each particular earth station has been heard. This activity is repeated at intervals of the predetermined period.

Thus, summarising FIG. 3, the user terminal 11 monitors the earth stations and assesses the quality of their signals at all times it is doing nothing else, creates a league table of earth stations, and when it wishes to communicate for any reason, tries first to page the earth station at which it is registered, and, in the event of failure, goes down the league table in descending order of quality assessed merit until an earth station 7A–E is found which responds. The user terminal then registers with that earth station 7A–E for next use, sends it the contents of the league table, and completes its current communication therewith. Periodically, the user terminal 11 revisits the league table to adjust scores against the length of time since a particular earth station 7A–E has heard.

Figure 4:
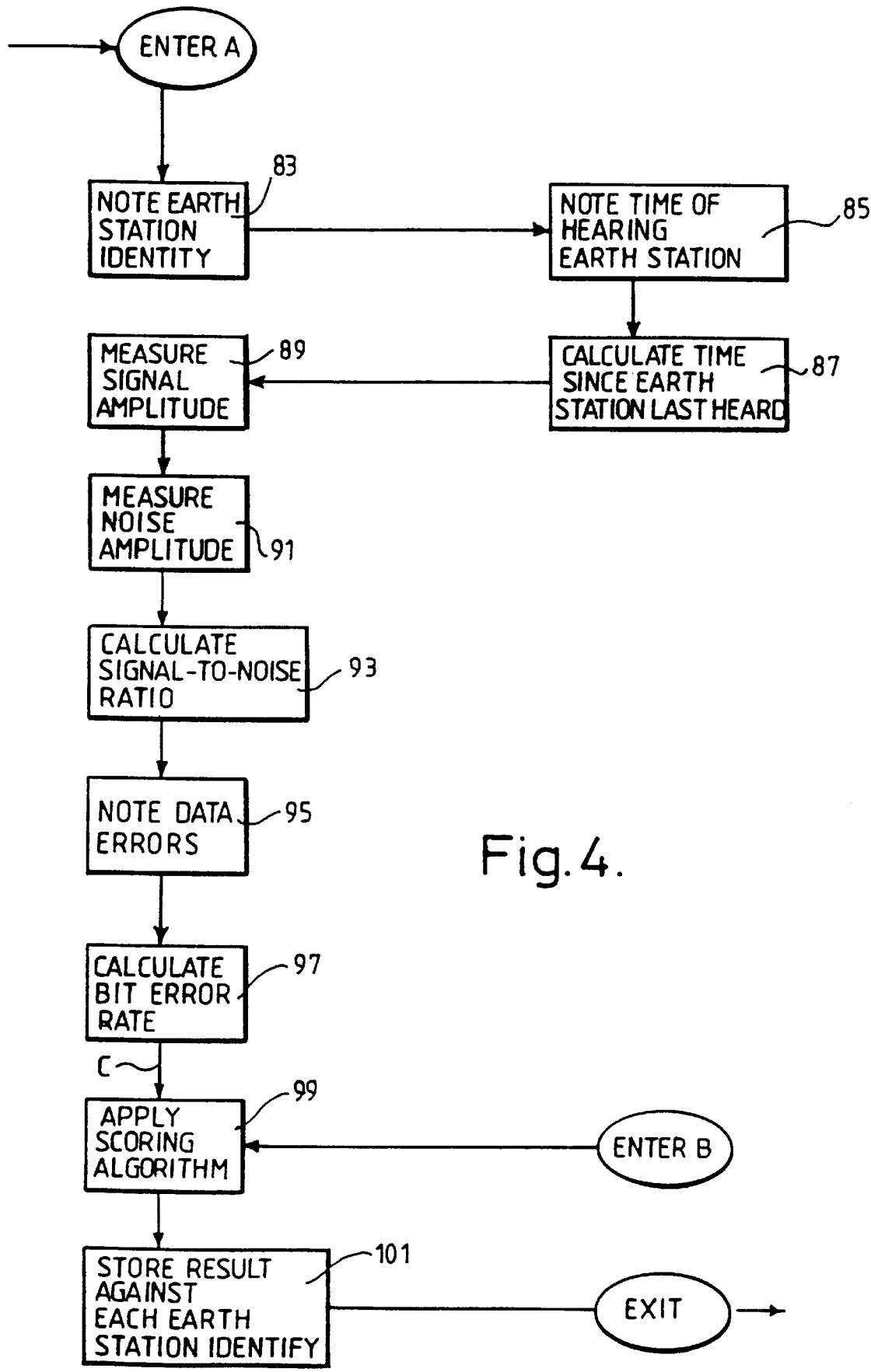
FIG. 4 is a flow chart, expanding upon the activity of FIG. 3 wherein the user terminal measures the quality of the signals received from each earth station and compiles the league table.

FIG. 4 is a flowchart detailing one possible embodiment of the portion of the second activity 55 of FIG. 3 which measures the quality of the particular earth station 7A–E which is being received by the user terminal 11 at that instant and makes up the league table.

When entered from the third test 53 of FIG. 3, the entry point being designated "A" in both FIGS. 3 and 4, control first passes to a ninth activity 83 which examines the received data stream from the earth station 7A–E which is currently broadcasting and extracts therefrom the portion which identifies the earth station 7A–E. If the, now identified, earth station is already listed in the league table, its listing remains thereon. If the, now identified, earth station is not already listed in the league table, a new entry is made in the league table for that earth station.

Having noted the earth station 7A–E identity, control passes to a tenth activity 85 which notes the current time. Control next passes to an eleventh activity 87 which recalls from memory a record of the time when that particular earth station 7A–E was last heard and calculates how long it has been since that earth station 7A–E last was audible. If no previous time is stored for the particular earth station 7A–E, it is presumed that this is the first occasion of entry onto the league table and a zero elapse of time is recorded.

Control next passes to a twelfth activity 89 which measures the amplitude of the signal received from the earth station 7A–E currently being heard. In those instances where the intermediate frequency amplifier 29 has a tight automatic gain control loop, this will be reflected in the binary numbers available to the signal processor 37 from the output 43 of the AGC analogue-to-digital converter 41. In those instances where the intermediate frequency amplifier 29 has a very loose or no automatic gain control loop, this will be reflected in the binary numbers presented to the signal processor 37 from the output of the signal analogue-to-digital converter 33. The stream of binary numbers can be assessed for mean value, peak value, RMS (root mean square) value, or any other quality which the designer of the embodiment of the present invention may care to employ.

Control then passes to a thirteenth activity 91 which measures the noise amplitude. The same process applies as in the twelfth activity 89, except that it is executed during a period or periods during which the earth station 7A–E is silent. This can happen immediately after the data stream from the earth station 7A–E has ended, or in any natural breaks in the data stream. A gap or post-transmission epoch is identified. The noise signal may merely be thermal in origin. Equally, the noise signal may comprise background interference. If only one noise sampling epoch is used, there is no means for differentiating between thermal noise and interference. If more than one noise sampling epoch is used, it is up to the designer of the embodiment of the present innention whether or not he selects the largest figure, the lowest figure, or some combination of some or all of the figures, as representative of the background noise.

Control is next passed to a fourteenth activity 93 which calculates the signal to noise ratio. Once again, it is a matter for the designer to elect the exact manner of the calculation dependently upon the type of data encoding and modulation method employed. Some systems are sensitive solely to the ratio of the RMS signal to noise ratio. Others may be susceptible to peak noise. Yet others may be most affected by semi-coherent interference. It is not a matter for the present invention exactly how the signal to noise ratio is estimated, simply that it is estimated, by taking a ratio between the signal amplitude (however assessed) and the noise amplitude (however assessed).

Control is next passed to a fifteenth activity 95 any where any data errors are noted. There are various ways in which data errors may become apparent. Where a message is already known, deviations in the binary code therefor from the paradigm count as bit errors. Equally, where row and column parity checks are available, calculation of the parity checks from the received data and comparison with the received parity check will reveal errors and indicate simple corrections. Reference is here made, by way of incorporation, to "An Introduction to Error-Correcting Codes" by Shu Lin, US Library of Congress Catalogue Card Number 76-124417 describing numerous methods of encoding and detection and correction of errors in data sets. It is not a matter of the present invention exactly how the data is encoded, nor how the data errors are detected. It is simply sufficient that data errors can be detected. Where insufficient data has been received to make an error rate measurement, this activity 95 and the subsequent seventeenth activity 97, are simply ignored until sufficient data is received, and the bit error rate adjustment to the score in the league table omitted until it can be performed. The inclusion of bit error rate related adjustment to league table scores is postponed until sufficient data is received.

Control is next passed to the seventeenth activity 97 where the bit error rate is calculated. The bit error rate is the number of data bits, in error, divided by the total number of data bits received.

Control next passes to an eighteenth activity 99 where the league table scoring algorithm is applied. This activity is described below, with reference to FIG. 5. This is also the point in the second activity 55 (FIG. 3) where entry is achieved from the first test 49 (FIG. 3) to make time-related correction to the scores in the league table, the entry point in both FIGS. 3 and 4 being designated by "B".

Having applied the scoring algorithm, control passes to a nineteenth activity 101 which makes up the league table by storing the scores, against the identity of each earth station 7A–E heard, for later reference and use.

Figure 5:
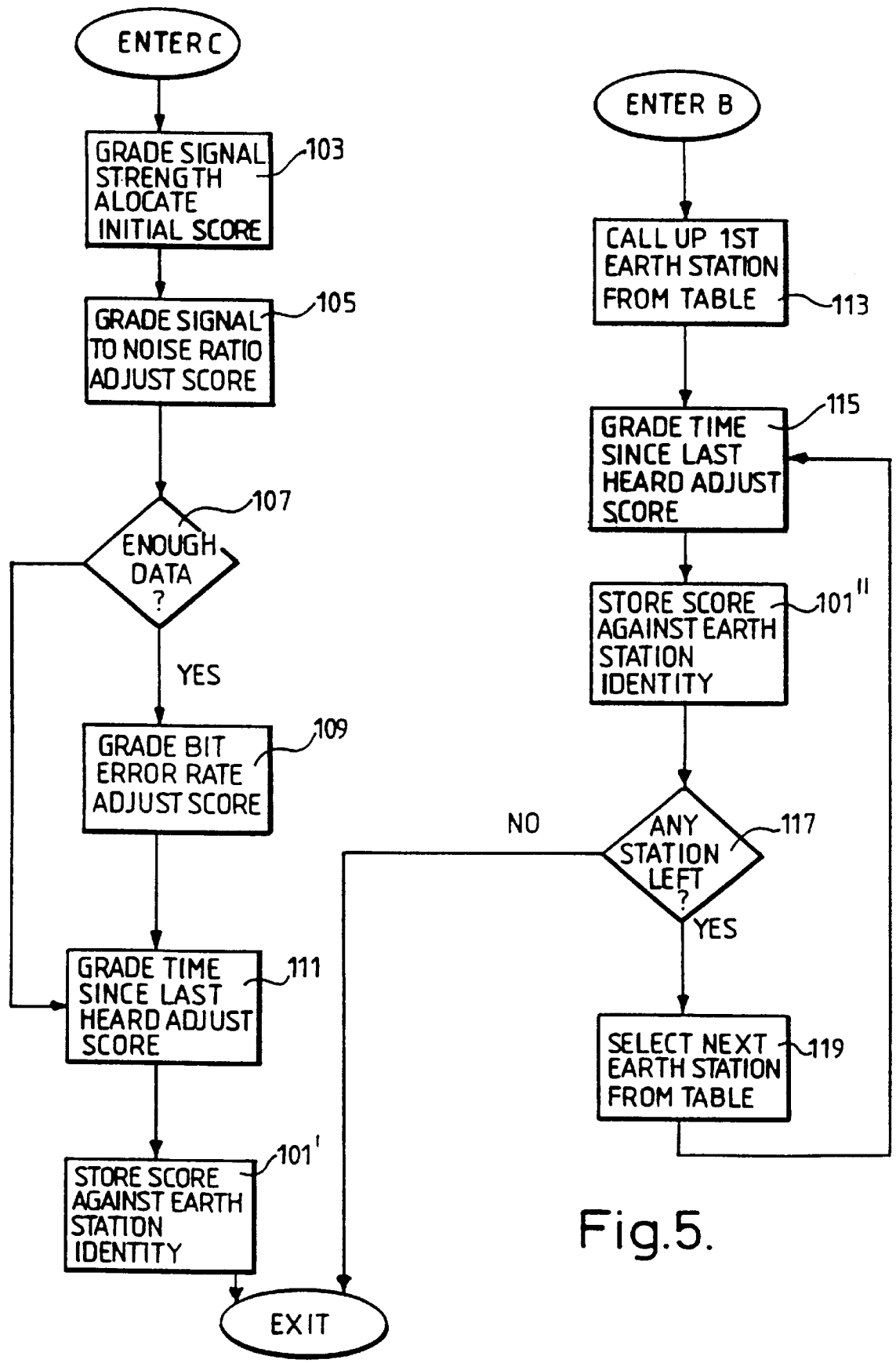
FIG. 5 is a flow chart of the scoring algorithm of FIG. 4.

FIG. 5 is a flow chart of the eighteenth activity 99 of FIG. 4 where the league table is made up, and includes the storage activities 101' and 101" equivalent, in two parts, to the nineteenth activity 101 of FIG. 4. Once again there are two entry points. When the flowchart is entered from the seventeenth activity 97, the entry point is designated "C" in both FIGS. 4 and 5. When the flowchart is entered from the second test 49, the entry point is designated "B" in FIGS. 3, 4 and 5.

When entered from the seventeenth activity 97, control is passed to a twentieth activity 103 which grades the signal strength and allocates an initial score. Table 1 below is an example of the manner in which the twentieth activity 103 can work.

TABLE 1

| GRADING AND SCORING FOR SIGNAL STRENGTH | |
|---|---|
| GRADE OF STRENGTH | INITIAL SCORE |
| Very strong | 5 |
| Strong | 4 |
| Acceptable | 3 |
| Weak | 2 |
| Very weak | 1 |

The grade given for each signal strength is at the choice of the designer. For preference, the gradation should follow a logarithmic law. Equally, the designer could chose a scale based on some known relationship between signal strength and reliability of decoding of whatever type of signal is involved. In this instance, a very simple rule is applied. If the most significant binary digit (bit) of the output of the analogue to digital converter 41 33 under inspection is ever logically true, the signal is deemed very strong and a score of 5 is given. If the most significant bit is never logically true, but the second most significant bit is at least once logically true, the signal is deemed strong and a score of 4 is given. If the most significant bit and the second most significant bit are never logically true, but the third most significant bit is at least once logically true during the period of sampling, the signal is deemed adequate and a score of 3 is given. If the fourth most significant bit is at least once true but no more significant bit is logically true during the period of sampling, the signal is deemed to be weak, and a score of 2 is given. It the fifth most significant bit is at least once logically true, but no more significant bit is ever logically true during the period of sampling, the signal is deemed very weak and a score of 1 is given. If not even the fifth most significant bit is even once true during the period of sampling, the signal is deemed too weak to be recognised and no entry is made on the league table for this occasion of "almost hearing". The above described system of grading and scoring creates a logarithmic scale based on steps of 6 decibels with a range of 30 decibels. If every alternative binary digit had been selected on the outputs of the analogue to digital converters 33 41, the steps would have been 12 decibels (dB) and the range 60 decibels. The curvilinear characteristics of any automatic gain control on the intermediate frequency amplifier 29 will impart even more compression to the output grading.

Control then passes to a twenty-first activity 105 which grades the signal to noise ratio and adjusts the score. Table 2 is an example of one way in which this grading and score adjusting operation can be implemented.

TABLE 2

| GRADING AND SCORE ADJUSTMENT FOR SIGNAL-TO-NOISE RATIO | | |
|---|---|---|
| S/N | ASSESSMENT | SCORE MULTIPLIER |
| >40 db | Very good | 3 |
| <40 db > 30 db | Good | 2 |
| <30 db > 20 db | Fair | 1 |
| <20 db > 10 db | Poor | 0.5 |
| <10 db | Very poor | 0.25 |

The choice of ranges and range limits in this example are arbitrary and merely serve to illustrate one way in which a falling signal to noise ratio (S/N) can be used to create a falling assessment of the score to be given to a particular earth station 7A–E as it is received. Dependently upon what kind of modulation is selected, what kind of signal encoding is used, and what kind of error correction is employed, the designer may wish to chose other ranges and other score multipliers. The score multiplier is used to multiply the initial score, from the twentieth operation, to give a truer assessment of the signal. If the signal strength is very high, giving an initial score of 5, but there is a lot of interference giving a multiplier in the twenty-first operation of 0.25, then the overall score would be 1.25. If, on the other hand, a signal scored 4 in the twentieth operation and 3 in the twenty-first operation, the overall score would be 12 reflecting that this second, weaker signal was actually of much better quality.

Although table 2 has indicated that the score should be multiplied by a correction factor to reflect quality of the signal in the overall score, it is also envisaged that the designer may choose, instead, to add or subtract a selected number from the initial score for each grade.

With completion of the twenty-first activity 105, control passes to an eleventh test 107 which checks to see if enough data has been received to measure the bit error rate. If enough data has been received, control passes to a twenty-second activity 109 which grades the bit error rate and adjusts the score so far allocated to the earth station 7A–E which is being assessed. Table 3 is an example of one way in which the twenty-second activity 109 can be implemented.

TABLE 3

GRADING AND SCORE ADJUSTMENT FOR BIT ERROR RATE

| QUALITY | SCORE MULTIPLIER |
|---|---|
| No Errors | 2 |
| Correctable errors | 1 |
| Acceptable Uncorrectable errors | 0.5 |
| Unacceptable Uncorrectable errors | 0 |

The score, so far accumulated for the earth station 7A–E from the twentieth 103 and twenty-first 105 activities is multiplied by the score multiplier to arrive at a new accumulated score. Once again, the boundaries and ranges chosen are purely by way of example and the individual designer may choose other criterea and ranges and different multipliers to reflect the conditions relevent to the particular form of modulation, data encoding scheme and error correction capacity of the particular system. Once again, the designer may also choose to add or subtract selected numbers for each grade. It is preferred, however, that multipliers are used, and in particular a zero multiplier for unacceptable service, since a score of zero counts as a failed entry and no new accumulated score will be added to the league table for the zero-core occasion of hearing the earth station 7A–E.

Control then passes to a twenty-third activity 111 which assesses earth station 7A–E quality against the time since that earth station 7A–E was last heard. Likewise, if the eleventh test 107 fails to detect enough data to enable an assessment of the bit error rate to be made, it passes control to the twenty-third activity 111.

Table 4 shows one example of how the twenty-third activity may be organised.

TABLE 4

SCORE ADJUSTMENT FOR ELAPSED TIME SINCE LAST HEARD

| Time Since Last Heard (T) | Score Multiplier |
|---|---|
| T < 10 minutes | 1 |
| 10 mins < T < 20 mins | 0.9 |
| 20 mins < T < 30 mins | 0.8 |
| 30 mins < T < 40 mins | 0.7 |
| 40 mins < T < 50 mins | 0.5 |
| 50 mins < T < 60 mins | 0.3 |
| T > 60 mins | 0 |

Once again, the selection of grades and ranges is soley for the sake of example. In systems with very low orbiting satellites, each satellite may be in view only for a few minutes so that short time intervals are appropriate. With higher orbit satellites, the time intervals can be longer since each satellite 9A–C is in view for longer potentially making each earth station 7A–E potentially receivable for longer periods.

Once again, the designer has the choice of ranges and multipliers. The designer can also elect to add or subtract selected numbers from the accumulated score instead of multiplying the accumulated score. Multiplication is preferred, however, since a zero score in the so-far accumulated score is still zero when multiplied, indicating the earth station 7A–E broadcast has failed at least one criterion of acceptability somewhere in the system. In particular, it is preferred that the standard of unacceptability (an elapsed time of greater than 60 minutes in this example) has a zero multiplier to nullify all of the previous accumulated score.

Control is next passed to the first variant 101' of the nineteenth activity 101. The overall accumulated score for this occasion of hearing an earth station 7A–E is added to the score already in the league table for that earth station. If the score is zero, it is as if the earth station had not been heard on this occasion, reflecting the unacceptability, in at least one of the assessments, of the reception of the broadcast from the earth station 7A–E. If the accumulated score to be added to the league table entry is zero, the time of last hearing, noted down in the tenth activity 85 of FIG. 4, is discarded and the previously noted time of hearing is used, reflecting the idea that an unsatisfactory hearing is not recognised.

The routine is then exited.

When entered from the first test 49 of FIG. 3, entry point "B" passes control to a twenty-fourth activity 113 which, on the elapse of a predetermined time, as defined by the first test 49, revisits the league table to see how long it has been since each earth station 7A–E, entered therein, has been heard. Against each entry in the league table, the tenth activity 85 (FIG. 4) has noted the time of last acceptable hearing of the earth station 7A–E. The twenty-fourth activity 113 calls up (recalls) the first entry in the league table (not necessarily the highest scoring, merely the first) and passes control to a twenty-fifth activity 115 which, with an awareness of the current time, grades the recalled accumulated score from the league table according to the same method as the twenty-third activity 111 as hereinbefore described, with the same limitations, in table 4, with the exception that this time, since the particular earth station 7A–E whose score has been recalled is not, instantly, providing a broadcast, the entire accumulated score is multiplied by the scoring multiplier rather than the immediate portion to be added, by the twenty-third operation 111, to the accumulated score. The second variant 101" of the nineteenth activity 101 (FIG. 4)

then takes the multiplied accumulated score and stores it as a new accumulated score against the earth station identity in question.

Thereafter, a twelfth test 117 checks to see if there are any remaining earth stations 7A–E on the league table which have not yet been graded and their scores adjusted. If there are none, common exit is made with the first variation 101' of the ninteenth test 101. If ungraded earth stations 7A–E remain on the league table, a twenty-sixth activity 119 selects another earth station from the league table and returns control to the twenty-fifth activity 115.

If an earth station 7A–E achieves a zero score as a result of the twenty-fifth activity 115, it is removed from the league table on the grounds that a station which is never heard (or at least, not in a long time) is hardly worth contacting. It simply is very unlikely to be there.

Figure 6:
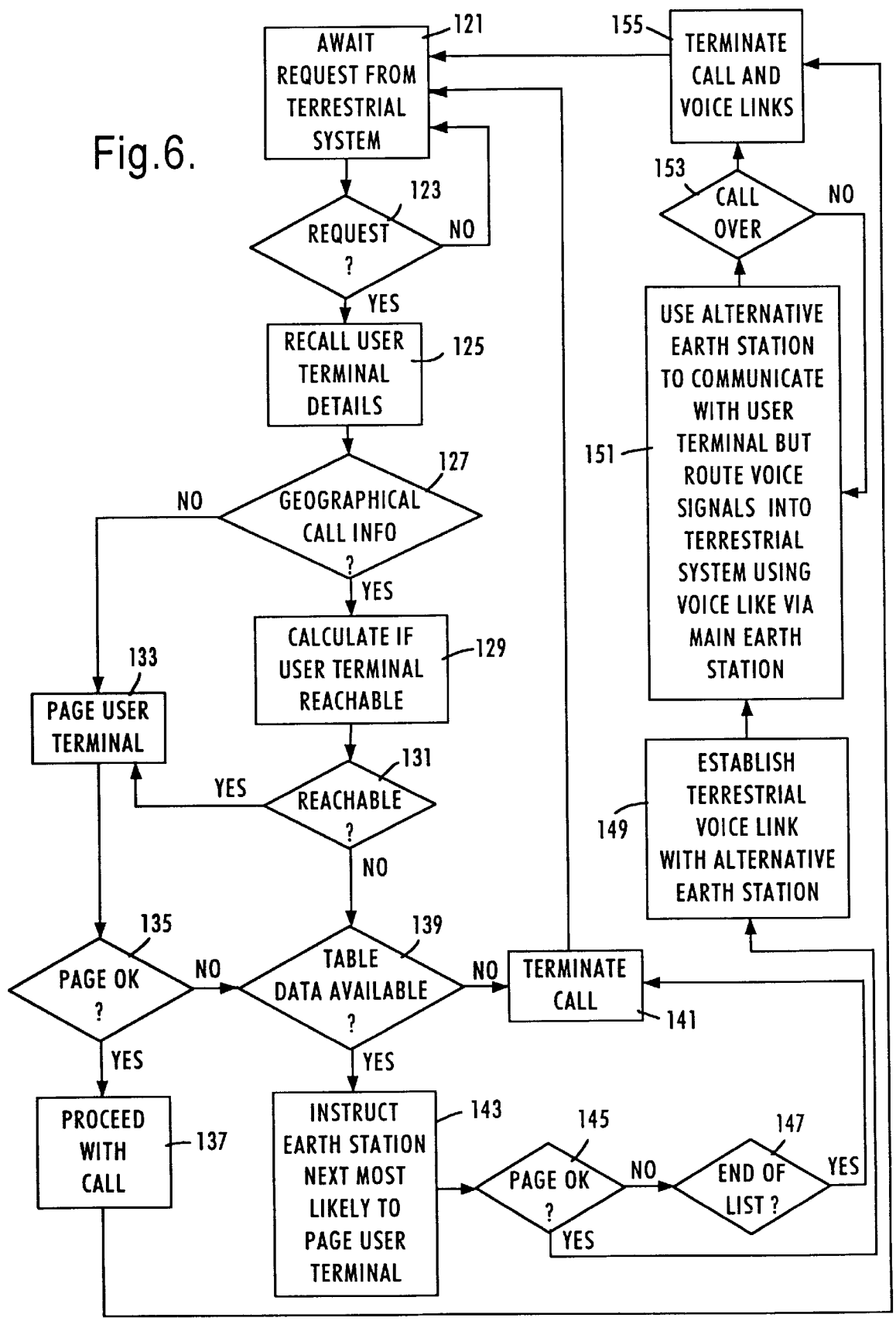
FIG. 6 is a flow chart of the activities of the supervisory earth station when originating a call from the terrestrial system to the user terminal.

FIG. 6 is a flowchart of the activities of the mobile satellite switching centre (chosen in this instance, per FIG. 1, to be 5C) whereat the user terminal 11 has been registered as a visitor location (17C).

A twenty-seventh activity 121 awaits a request from the terrestrial system 1 until a thirteenth test 123 detects such a request, whereupon control is passed to a twenty-eighth activity 125 which recalls the details of the particular user terminal it is desired to access from the visitor location register 17C and its associated memories.

A fourteenth test 127 checks the associated data to see if a geographical location is stored. This data, as was earlier described, is derived from a prior knowledge of the position of the satellites 9A–C, Doppler frequency shift measurements and measurement of signal path delays to determine the location of the user terminal to within some 50 kilometers on the surface of the earth. If such a location is stored, control is passed to a twenty-ninth activity 129 where it is calculated whether or not, given the instant disposition of the satellites 9A–E, the user terminal 11 can contact the earth station 7C whereat it is registered as a visitor from its last recorded location. If a fifteenth test 131 confirms that the user terminal 11 can, at that instant, be reached, control is passed to a thirtieth activity 133 which causes the user terminal 11 to be paged. If the user terminal 11 is successfully paged, a sixteenth test 135 passes control to a thirty-first activity 137 which allows the call to the user terminal 11 to proceed and passes control back to the twenty-seventh activity 121 on call completion.

If the fourteenth test 127 detected no geographical details, it is still a fair bet that the particular earth station 7C whereat the user terminal 11 is listed as a visitor is the most likely earth station 7C to reach it. Accordingly, the fourteenth test 127, if no geographical data is available, passes control to the thirtieth activity 133 which pages the user terminal 11 in any event and proceeds with the call if successful.

If the attempt to page the user terminal 11 has failed, or if the user terminal 11 has been deemed unreachable by the fifteenth test 131, a seventeenth test 139 checks to see if the details of the league table, generated by the user terminal in the third activity 29 and sent, at last access, by the sixth activity 41, to the earth station 17C, are present. If no league table data is available, the seventeenth test 139 passes control to a thirty-second activity 141 which terminates the attempted contact with the user terminal 11 and passes control back to the twenty-seventh activity 121 where the mobile satellite switching centre 17C awaits a further approach from the terrestrial system 1.

If the seventeenth test 139 detects the presence of the league table data, received from the user terminal 11, it passes control to a thirty-third activity 143 which causes the user terminal 11 to be addressed from another earth station 7A–E.

Let us say, for the sake of example, that the user terminal had allocated a score of 25 to a first earth station 7B, allocated a score of 50 to a second earth station 7C and allocated a score of 10 to a third earth station 7D. Now the earth station 7C 5C whereat the user terminal 11 is registered as a visitor is clearly unable to make contact. Accordingly, the thirty-third activity 143 selects the next most likely earth station 7B, with 25 calls in the league table, to address the user terminal 11.

The mobile satellite switching centre 5C, whereat the user terminal is registered as a visitor, becomes a hub and maintains access to the terrestrial network 1 as the gateway for the user terminal 11 despite the user terminal 11 being addressed by a different earth station 7B.

Firstly, the second earth station 7C sends a message via the data link 19 to the first earth station 7B commanding the first earth station 7B to page the user terminal 11. The first earth station 7B attempts the page and reports back to the second earth station 7C whether or not the paging attempt was successful. If an eighteenth test 145 detects that the paging attempt was unsuccessful, and a nineteenth test 147 detects that there are still other earth stations audible to the user terminal 11, control is passed back to the thirty-third activity 143 where the next most likely earth station 7D is selected.

For the sake of this example, let us imagine that the paging attempt from the third earth station 7D has succeeded. The eighteenth test 145 passes control to a thirty-fourth activity 149 where the mobile satellite switching centre 5C at the second earth station 7C establishes the voice link 21 to the mobile satellite switching centre 5D at the third earth station 7D. This has earlier been described. Control is then passed to a thirty-fifth activity 151 where the third earth station 7D actually communicates with the user terminal 11, but the voice message and any other data for the terrestrial system 1 are passed via the voice link 21 to enter the terrestrial system 1 via the mobile satellite switching centre 5C at the second earth station 7C.

When a twentieth test 153 detects that the call is over, control is passed to a thirty-sixth activity 155 where the third earth station 7D is instructed to terminate its contact with the user terminal 11, the mobile satellite switching centre 5C at the second earth station 7C disconnects the voice link 21 between itself and the mobile satellite switching centre 5D at the third earth station 7D, and the mobile satellite switching centre 5C at the second earth station 7C disconnects from the terrestrial network 1. Control then passes back to the twenty-seventh activity 121 where the mobile satellite switching centre 5C at the second earth station 7C awaits requests from the terrestrial system 1.

Had the league table from the user terminal 11 been otherwise than as in the example given, the thirty-third activity 143 would simply have gone down the list of earth stations 7A–E in descending order of their probability of accessibility to the user terminal 11 as reflected by the score entered against each earth station 7A–E in the league table, until an earth station 7A–E was found that could successfully page the user terminal 11.

The thirty-second activity 141 can also have another variant where league table information is not available. Instead of simply terminating the call, in the thirty-second activity 141 the mobile satellite switching centre 5C at the second earth station 7C uses the digital link 19 to instruct other earth stations 7C, in the geographic vicinity of where the user terminal 11 was believed to be, or simply surrounding the second earth station 7C, to see if a successful page could be executed. If a page succeeds, the contact is made via the other earth station 7A–E as described above. If a successful page is not possible, the call is terminated.

As an example of this last variant, if a user terminal is believed to be somewhere in the Caribbean, but cannot be paged from a North American earth station 7 where its visitor location is stored, because of its location the user terminal might be accessible from earth stations 7 in South America or Africa. Accordingly, the North American earth station 7 causes the African and South American earth stations 7 to attempt to page the user terminal 11.

If no information is available concerning the likely location of the user terminal 11, its visitor location earth station 7 in North America commands not only the South American and African earth stations 7 to attempt to page the user terminal 11, but also in Europe, the Pacific Rim and the polar region. In this way the earth station 7 whereat the user terminal has its visitor location does its best to complete the ring around itself so that, no matter in which direction the user terminal 11 may have escaped, it can be found.

A variant exists for the twenty-ninth activity 129. Instead of simply taking the last known geographical location of the user terminal 11, the times and locations of the user terminal 11 on a previous plurality of accesses are used to plot, for example, a speed and direction for the user terminal 11 which would be of great utility if the user terminal were on a rapidly moving transport such as a jet aircraft or a low orbiting spacecraft. An estimate of the present location can then be made when calculating whether or not the user terminal 11 is accessible and the appropriate earth station 7 closest to the estimated location instructed to page the user terminal 11.

We claim:

1. A satellite communication system wherein a user terminal is operative to communicate with one or more out of a plurality of satellites; wherein each of said plurality of satellites is operative to communicate with one or more out of a plurality of earth stations to provide communication between said user terminal and at least one of said earth stations; where each of said earth stations is operative, periodically, to provide a broadcast message, via said satellites, which can be received by said user terminal, said broadcast message identifying that earth station from which it originated; and wherein said user terminal is operative to monitor said broadcasts: said system being characterised by said user terminal being operative to perform an assessment of the quality of the signal in each broadcast message received; by said user terminal being operative to establish and maintain a league table based on the assessed quality of the signal in said broadcast messages received from each of said plurality of earth stations whose broadcast messages are audible to said user terminal; and by said user terminal being operative, when making a request for service from said system, to direct said request to that one out of said plurality of earth stations which is top of said league table.

2. A system, according to claim 1, wherein said assessment of the quality of the signal, in said broadcast messages received by said user terminal, includes an assessment of the strength of the signal.

3. A system, according to claim 2, wherein said assessment of the quality of the signal, in said broadcast messages, received by said user terminal, includes an assessment of the signal to noise ratio of the signal.

4. A system, according to claim 3, wherein said assessment of said signal to noise ratio includes measurement of the strength of unwanted or extraneous signals immediately before or after each of said broadcast messages, and comparison thereof against said assessment of said strength of said signal in said broadcast message.

5. A system according to claim 1, wherein said assessment of the quality of the signal, in said broadcast messages, received by said user terminal, includes an assessment of the bit error rate.

6. A system according to claim 1, wherein said assessment of the quality of the signal, in said broadcast messages, received by said user terminal from a particular earth station out of said plurality of earth stations, includes an assessment of the amount of elapsed time since a broadcast message was received from that particular earth station.

7. A system, according to claim 1, wherein said user terminal, in the event of said request for service, directed to said earth station, which has the highest assessment in said league table, being unsuccessful, is operative to select each other earth station, in said league table, in turn, in descending order of assessment, to direct said request for service thereto, until an earth station is found which responds to said request for service.

8. A method for use in a satellite communication system wherein a user terminal is operative to communicate with one or more out of a plurality of satellites; wherein each of said plurality of satellites is operative to communicate with one or more out of a plurality of earth stations to provide communication between said user terminal and at least one of said earth stations; where each of said earth stations is operative, periodically, to provide a broadcast message, via said satellites, which can be received by said user terminal, said broadcast message identifying that earth station from which it originated; and wherein said user terminal is operative to monitor said broadcasts; said method being characterised by including the steps of: said user terminal performing an assessment of the quality of the signal in each broadcast message received; said user terminal establishing and maintaining a league table based on the assessed quality of the signal in said broadcast messages received from each of said plurality of earth stations whose broadcast messages are audible to said user terminal; and said user terminal, when making a request for service from said system, directing said request to that one out of said plurality of earth stations which is top of said league table.

9. A method, according to claim 8, wherein said assessment of the quality of the signal, in said broadcast messages received by said user terminal, includes an assessment of the strength of the signal.

10. A method, according to claim 9, wherein said assessment of the quality of the signal, in said broadcast messages, received by said user terminal, includes an assessment of the signal to noise ratio of the signal.

11. A method, according to claim 10, wherein said assessment of said signal to noise ratio includes measurement of the strength of unwanted or extraneous signals immediately before or after each of said broadcast messages, and comparison thereof against said assessment of said strength of said signal in said broadcast message.

12. A method, according to claim 8, wherein said assessment of the quality of the signal, in said broadcast messages, received by said user terminal, includes an assessment of the bit error rate.

13. A system according to claim 8, wherein said assessment of the quality of the signal, in said broadcast messages, received by said user terminal from a particular earth station out of said plurality of earth stations, includes an assessment of the amount of elapsed time since a broadcast message was received from that particular earth station.

14. A method, according to claim 8, including the steps of said user terminal, in the event of said request for service, directed to said earth station, which has the highest assessment in said league table, being unsuccessful, selecting each other earth station, in said league table, in turn, in descending order of assessment, and directing said request for service thereto, until an earth station is found which responds to said request for service.

15. A user terminal for use in a satellite communication system wherein said user terminal is operative to communicate with one or more out of a plurality of satellites; wherein each of said plurality of satellites is operative to communicate with one or more out of a plurality of earth stations to provide communication between said user terminal and at least one of said earth stations; where each of said earth stations is operative, periodically, to provide a broadcast message, via said satellites, which can be received by said user terminal, said broadcast message identifying that earth station from which it originated; and wherein said user terminal is operative to monitor said broadcasts; said user terminal being characterised by being operative to perform an assessment of the quality of the signal in each broadcast message received; by said user terminal being operative to establish and maintaining a league table based on the assessed quality of the signal in said broadcast messages received from each of said plurality of earth stations whose broadcast messages are audible to said user terminal; and by said user terminal, when making a request for service from said system, being operative to direct said request to that one out of said plurality of earth stations which is top of said league table.

16. A user terminal, according to claim 15, wherein said assessment of the quality of the signal, in said broadcast messages received by said user terminal, includes an assessment of the strength of the signal.

17. A user terminal, according to claim 16, wherein said assessment of the quality of the signal, in said broadcast messages, received by said user terminal, includes an assessment of the signal to noise ratio of the signal.

18. A user terminal, according to claim 17, wherein said assessment of said signal to noise ratio includes measurement of the strength of unwanted or extraneous signals immediately before or after each of said broadcast messages, and comparison thereof against said assessment of said strength of said signal in said broadcast message.

19. A user terminal, according to claim 15, wherein said assessment of the quality of the signal, in said broadcast messages, received by said user terminal, includes an assessment of the bit error rate.

20. A user terminal, according to claim 15, wherein said assessment of the quality of the signal, in said broadcast messages, received by said user terminal from a particular earth station out of said plurality of earth stations, includes an assessment of the amount of elapsed time since a broadcast message was received from that particular earth station.

21. A user terminal, according to claim 15, wherein said user terminal, in the event of said request for service, directed to said earth station, which has the highest assessment in said league table, being unsuccessful, is operative to select each other earth station, in said league table, in turn, in descending order of assessment, and to direct said request for service thereto, until an earth station is found which responds to said request for service.

22. A supervisory earth station, for use in a satellite communication system wherein a user terminal is operative to communicate with one or more out of a plurality of satellites; wherein each of said plurality of satellites is operative to communicate with said supervisory earth station and with one or more out of a plurality of other earth stations to provide communication between said user terminal and at least one of said supervisory earth station or said other earth stations; where each of said earth stations is operative, periodically, to provide a broadcast message, via said satellites, which can be received by said user terminal, said broadcast message identifying that earth station from which it originated; wherein said user terminal is operative to monitor said broadcasts; wherein said user terminal is operative to perform an assessment of the quality of the signal in each broadcast message received; wherein said user terminal is operative to establish and maintaining a league table based on the assessed quality of the signal in said broadcast messages received from each of said plurality of earth stations whose broadcast messages are audible to said user terminal; and wherein said user terminal, when making a request for service from said system, is operative to direct said request to said supervisory earth station, if said supervisory earth station is top of said league table, or to that one out of said plurality of other earth stations which is top of said league table; said supervisory earth station being operative to receive said league table from said user terminal and, when subsequently paging said user terminal, being operative to select, in turn, in descending order of assessment, itself or each of said plurality of other earth stations, to page said user terminal until an earth station is found to whose paging said user terminal responds.

23. A supervisory earth station, according to claim 22, for use in a system wherein said assessment of the quality of the signal, in said broadcast messages received by said user terminal, includes an assessment of the strength of the signal.

24. A supervisory earth station, according to claim 23, for use in a system wherein said assessment of the quality of the signal, in said broadcast messages, received by said user terminal, includes an assessment of the signal to noise ratio of the signal.

25. A supervisory earth station, according to claim 24, for use in a system wherein said assessment of said signal to noise ratio includes measurement of the strength of unwanted or extraneous signals immediately before or after each of said broadcast messages, and comparison thereof against said assessment of said strength of said signal in said broadcast message.

26. A supervisory earth station, according to claim 22, for use in a system wherein said assessment of the quality of the signal, in said broadcast messages, received by said user terminal, includes an assessment of the bit error rate.

27. A supervisory earth station, according to claim 22, for use in a system wherein said assessment of the quality of the signal, in said broadcast messages, received by said user terminal from said supervisory earth or any particular other earth station out of said plurality of other earth stations, includes an assessment of the amount of elapsed time since a broadcast message was received from said supervisory earth station or said particular other earth station out of said plurality of other earth stations.

* * * * *